US011861550B2

(12) United States Patent
Wang

(10) Patent No.: US 11,861,550 B2
(45) Date of Patent: Jan. 2, 2024

(54) FRAUD PREVENTION USING AUDIO PAIRING OF DEVICES

(71) Applicant: Maplebear, Inc., San Francisco, CA (US)

(72) Inventor: Dylan Wang, San Francisco, CA (US)

(73) Assignee: Maplebear Inc., San Francisco, CA (US)

( * ) Notice: Subject to any disclaimer, the term of this patent is extended or adjusted under 35 U.S.C. 154(b) by 240 days.

(21) Appl. No.: 17/240,977

(22) Filed: Apr. 26, 2021

(65) Prior Publication Data

US 2022/0343272 A1    Oct. 27, 2022

(51) Int. Cl.
*G06Q 10/0833*    (2023.01)
*G06F 21/32*    (2013.01)
*G06Q 50/30*    (2012.01)

(52) U.S. Cl.
CPC ......... *G06Q 10/0833* (2013.01); *G06F 21/32* (2013.01); *G06Q 50/30* (2013.01)

(58) Field of Classification Search
CPC ..... G06Q 10/0833; G06Q 50/30; G06F 21/32
See application file for complete search history.

(56) References Cited

U.S. PATENT DOCUMENTS 11,475,778 B1 *    10/2022    Kaneria ................. G06F 21/32

OTHER PUBLICATIONS

Kamran Ahsan, Mobile-Controlled UAVs for Audio Delivery Service and Payload Tracking Solution, 2019, p. 149672-149673 (Year : 2019).*

* cited by examiner

*Primary Examiner* — Ibrahim N El-Bathy
(74) *Attorney, Agent, or Firm* — Fenwick & West LLP

(57) ABSTRACT

When an online system receives an order from a customer, the online system can fulfill the order (for example, using a picker to acquire and deliver the ordered items) and use audio verification to verify delivery. When using audio verification, a customer or picker's mobile device plays verification audio including a verification code specific to the order. If the mobile devices (and, by proxy, the customer and picker) are nearby (for example, within 10 feet), the other party's mobile device can detect the verification audio through a microphone and decode the verification code from the captured audio. In some implementations, audio verification can also be performed using a smart doorbell or smart home without the presence of the customer.

20 Claims, 6 Drawing Sheets

FRAUD PREVENTION USING AUDIO PAIRING OF DEVICES

BACKGROUND

This disclosure relates generally to verifying physical delivery of an item or order to be delivered to a customer.

In current online systems and mobile applications, a customer creates an order of items to be purchased from a retailer and later fulfilled and delivered to the customer (or other selected location) by a picker. The online system may implement procedures for confirming or verifying that a delivery was made and/or received by the intended customer (as there is a potential for error/fraud if deliveries are not confirmed). Implementing delivery verification procedures is not trivial, especially when a contactless delivery is requested, or the order is delivered when the customer is not home. Many traditional methods of delivery verification (such as having a customer physically sign off on the delivery) cannot easily be performed contactless or without the direct presence of the customer. Therefore, improved methods of verifying physical delivery are needed.

SUMMARY

When an online system receives an order from a customer, the online system can fulfill the order (for example, using a picker to acquire and deliver the ordered items). When the order is ready to be delivered the online system can use audio verification to verify delivery. When using audio verification, a customer or picker's mobile device plays verification audio including a verification code specific to the order. If the mobile devices (and, by proxy, the customer and picker) are nearby (for example, within 10-15 feet), the other party's mobile device can detect the verification audio through a microphone and decode the verification code from the captured audio. If the mobile devices are not relatively close to each other the delivery cannot be verified using the audio verification method, indicating that the picker is at the wrong address and/or that additional verification should be performed before delivery. In some implementations, audio verification can also be performed using a smart doorbell or smart home without the presence of the customer.

The use of one or more verification methods can reduce the potential for errors or fraud occurring for that order. An error/fraud can occur for example, when a picker reports an order as delivered, but the customer did not receive the order (due to a mis-delivery to the wrong person or address, an oversight, or fraud) or when a customer receives an order but reports to the OCS 102 that the order was not received (intentionally or not). If audio verification is used for the order, the verification can help establish that the picker and the customer were at the same location at the time of delivery (or that the picker was near the smart home device of the customer etc.).

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes and may not have been selected to delineate or circumscribe the inventive subject matter.

Figure 1:
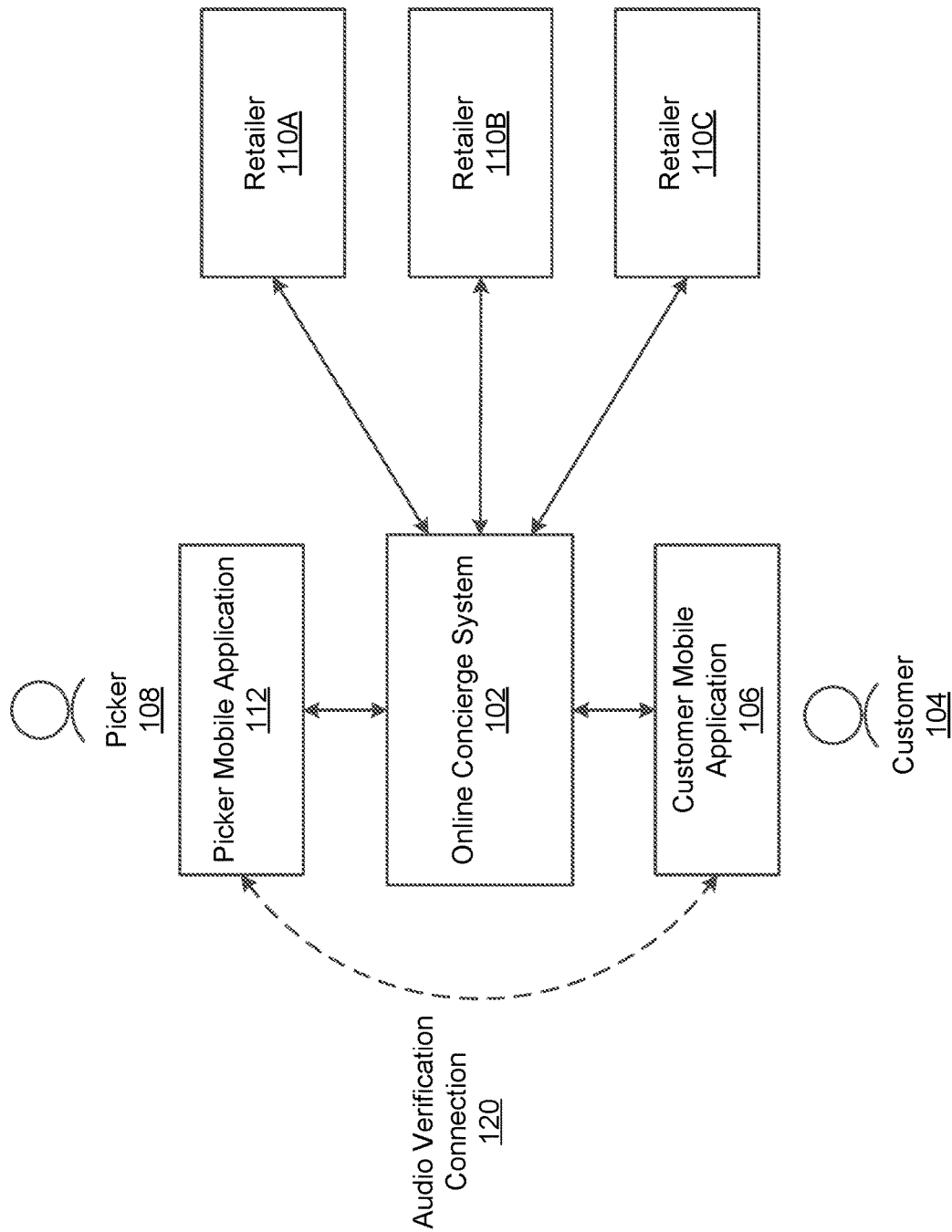
FIG. 1 illustrates the environment of an online concierge system using audio verification, according to an example embodiment.

The figures depict embodiments of the present invention for purposes of illustration only. One skilled in the art will readily recognize from the following description that alternative embodiments of the structures and methods illustrated herein may be employed without departing from the principles of the invention described herein. The figures use like reference numerals to identify like elements. A letter after a reference numeral, such as "110A," indicates that the text refers specifically to the element having that particular reference numeral. A reference numeral in the text without a following letter, such as "110," refers to any or all of the elements in the figures bearing that reference numeral. For example, "110" in the text refers to reference numerals "110A," "110B," and/or "110C" in the figures.

DETAILED DESCRIPTION

System Environment

FIG. 1 illustrates the environment of an online concierge system using audio verification, according to an example embodiment. The environment 100 of FIG. 1 includes an online concierge system (OCS) 102, a customer 104 using a customer mobile application 106 and a picker 108 using a picker mobile application 112 communicating over an audio verification connection 120, and several retailers 110A, 110B, and 110C. For simplicity, only one customer 104, customer mobile application 106, picker 108, and picker mobile application 112 are shown in the environment 100. In other embodiments, online concierge systems 102 may operate in environments with more or different entities than those shown in environment 100.

In the environment 100, the online concierge system (OCS) 102 is configured to receive orders from one or more customers 104 (FIG. 1 shows only one customer 104 for the sake of simplicity). A customer 104 can be a user of the OCS 102 able to place orders with the OCS 102. In some implementations, an order specifies a list of goods (items or products) to be delivered to the customer 104 (or another location specified by the customer). An order can also specify the location to which the goods are to be delivered, and a time window during which the goods should be delivered. In some embodiments, the order specifies one or more retailers 110 from which the selected items will be sourced. A customer 104 may use the customer mobile application (CMA) 106 executing on a client device (herein, the "customer device") to place the order; the CMA 106 is configured to communicate with the online concierge system 102. In some embodiments, customers 104 select items to purchase, delivery options, retailers 110, and the like through a browsing or shopping user interface of the customer mobile application 106. The CMA 106 will be discussed further in relation to FIG. 3A.

The online concierge system 102 may transmit orders received from customers 104 (via a CMA 106) to one or more pickers 108 (FIG. 1 shows only one picker 108 for the sake of simplicity). A picker 108 may be a contractor or employee of the OCS 102 or other person (or entity) who is enabled to fulfill orders received by the online concierge system 102. Each picker 108 fulfills orders received from the online concierge system 102 at one or more retailers 110 and/or delivers the order to the customer 104. In some implementations, pickers 108 fulfill orders in part by purchasing ordered items at retailers 110 (a "fulfillment purchase") using a payment method associated with the OCS 102, such as a credit or debit card associated with the online concierge system 102 (an "OCS payment method"). In one embodiment, pickers 108 make use of the picker mobile application (PMA) 112 executing on a mobile device (herein, a "picker device"), which is configured to interact with the online concierge system 102. The PMA 112 will be discussed further in relation to FIG. 3B.

In some implementations, the OCS 102 allows customers to purchase food items, ingredients, and/or other goods from the inventories of one or more retailers 110. For simplicity, the FIG. 1 shows three retailers, 110A, 110B, and 110C (however, an environment could include hundreds of retailers 110). The retailers 110 may be physical retailers (such as grocery stores, discount stores, department stores, etc.) and/or non-public warehouses storing items that can be collected and delivered to customers 104. Retailers 110 may be independent from each other and can each be associated with their own inventory. In some implementations, the OCS 102 maintains separate product catalogs and current inventory levels for each retailer 110 in order to present an up-to-date list of available products to customers 104.

Online Concierge System

Figure 2:
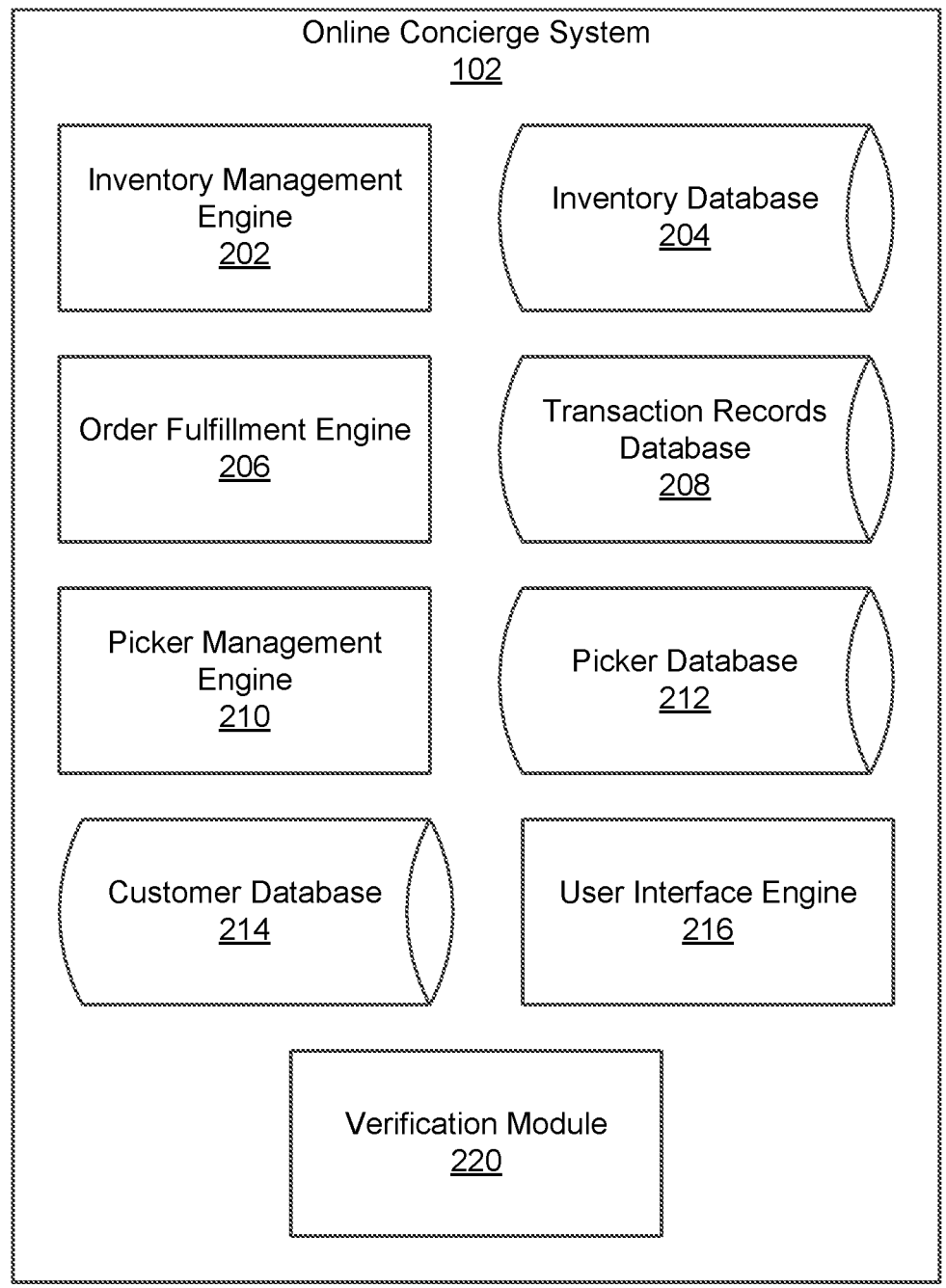
FIG. 2 is a block diagram of an online concierge system including a verification module, according to an example embodiment.

FIG. 2 is a block diagram of an online concierge system including a verification module, according to an example embodiment. The OCS 102 includes an inventory management engine 202, which interacts with inventory systems associated with retailers 110. The inventory of each retailer 110 is unique and may change over time. The inventory management engine 202 monitors changes in inventory for each participating retailer 110. The inventory management engine 202 is also configured to store inventory records in an inventory database 204. The inventory database 204 may store information in separate records—one for each participating retailer 110—or may consolidate or combine inventory information into a unified record. Inventory information stored in the inventory database 204 can include both qualitative and quantitative information about items available through the online concierge system 102, including size, color, weight, SKU, serial number, and so on. In one embodiment, the inventory database 204 also stores purchasing rules associated with each item, if they exist. For example, age-restricted items such as alcohol and tobacco may be flagged accordingly in the inventory database 204.

The online concierge system 102 also includes an order fulfillment engine 206 which is configured to manage orders made by customers 104 (for example, via the customer mobile application 106). The order fulfillment engine 206 may access the inventory database 204 in order to determine retailer 110 product availability and set the price for each item ordered by a customer 104. The order fulfillment engine 206 also facilitates transactions associated with each order including initial transactions between the OCS 102 and the customer placing the order and any fulfillment purchases made by pickers 108 in the course of fulfilling the order. In one embodiment, the order fulfillment engine 206 charges a payment instrument associated with a customer 104 when he/she places an order and may transmit payment information to an external payment gateway or payment processor. Similarly, the order fulfillment engine 206 may determine that an order has been fulfilled by the OCS 102 (for example, after delivery of the ordered products by a picker 108) and/or require that delivery of certain orders is verified (using one or more verification methods) by the verification module 220 before an order is considered completed/delivered. As described above, requiring delivery verification of orders can reduce the potential for fraud within the OCS 102.

In some implementations, the order fulfillment engine 206 stores payment, transactional, and verification information associated with each order in a transaction records database 208. For example, a record of an order stored in the transaction records database 208 can include information about the contents, date, and price of the order, for example an identification of a customer 104 placing the order and the picker 108 filling the order, a list of items included in the order (and corresponding prices), a total price of the order, information about the retailer(s) where the items were sourced from, and dates that the order was placed and fulfilled, and similar information about fulfillment purchases made by pickers 108 when fulfilling one or more orders at retailers 110. In some embodiments, the record of an order additionally includes information about the verification of the order, such as the verification method(s) used (if any), the results of the verification methods, and the like.

In some embodiments, the order fulfillment engine 206 also shares order details with retailers 110 associated with the order. For example, after successful fulfillment of an order, the order fulfillment engine 206 may transmit a summary of the order to the appropriate retailer(s) 110. The summary may indicate the items purchased, the total value of the items, whether (and how) the fulfillment was verified and in some cases, identifiers of the picker 108 and/or customer 104 associated with the transaction. In one embodiment, the order fulfillment engine 206 pushes transaction and/or order details asynchronously to systems of retailers 110. This may be accomplished via use of webhooks, which enable programmatic or system-driven transmission of information between web applications. In another embodiment, retailer systems may be configured to periodically poll the order fulfillment engine 206, which provides detail of all orders which have been processed since the last request.

The order fulfillment engine 206 may interact with a picker management engine 210, which manages communication with and utilization of pickers 108 to fulfill and deliver orders. In some implementations, the picker management engine 210 identifies the appropriate picker 108 and retailer(s) 110 to fulfill orders received by the order fulfillment engine 206. Based on the selected picker 108 and retailer 110, the picker management engine 210 may instruct the picker to fulfill the order. In some implementations, the picker management engine 210 selects the retailer(s) 110 from which products will be sourced to fulfill each incoming order based on one or more parameters, such as the contents of the order, the current inventory of the retailer 110, and the proximity of the retailer 110 to the delivery location. In some cases, one or more retailers 110 are specified in the order (for example, if a desired retailer selected by the customer 104 in the process of making the order). Based on the selected retailers 110, the picker management engine 210 may identify one or more appropriate pickers 108 to fulfill the order based on, for example, the picker's proximity to the appropriate retailer 110, customer 104, and/or delivery location, the picker's familiarity level with that particular retailer 110, and the like. Additionally, the picker management engine 210 may access a picker database 212 storing information describing each picker 108, including, picker ID number or other identifier, name, gender, picker rating, previous shopping history, and so on. The picker management engine 210 transmits the list of items in the order to the picker 108 via the picker mobile application 112. The picker database 212 may also store data describing the sequence in which the pickers 108 picked the items in their assigned orders.

As part of fulfilling an order, the order fulfillment engine 206 and/or picker management engine 210 may access a customer database 214 which stores information describing each customer 104. This information could include each customer's name, address, gender, shopping preferences, favorite items, stored payment instruments, and the like.

To facilitate communication between customers 104 and pickers 108, the online concierge system 102 may include a user interface engine 216 which generates content for display in user interfaces of the customer mobile application 106 or the picker mobile application 112 and manages interactions between the OCS 102 and customers 104/pickers 108. The user interface engine 216 can also send and receive additional information via customer mobile application 106 or picker mobile application 112, such as in the form of messages, texts, emails, or push notifications. Similarly, the order fulfillment engine 206 can generate user interfaces needed to perform delivery verification and receive any results of verification methods performed on a customer mobile application 106 or picker mobile application 112. For example, the user interface engine 216 can generate an ordering user interface for display on the customer mobile application 106 allowing a user to browse, select, and change items to be included in an order. Ordering user interfaces generated by the online concierge system 102 can be configured to display items out of the available items of one or more retailers 110 (for example, retailers 110 within a threshold distance of the customer 104 the ordering user interface will be displayed to). Additionally, the user interface engine 216 can generate UIs for display to a picker 108 through the PMA 112. For example, the user interface engine 216 can generate UIs for delivering orders allowing a picker 108 to perform delivery verification and mark an order as completed.

The verification module 220 determines if verification of an order is required, and if so which verification method to use, according to some embodiments. The verification module 220 may instruct a CMA 106, PMA 112, customer 104 and/or picker 108 to perform a selected verification method. In some implementations, verification methods serve to document various points in the delivery of an order to allow the OCS 102 to detect fraudulent reports or delivery errors. Errors or fraud can occur in situations where, for example, a picker reports an order as delivered but the customer did not actually receive the order or when a customer receives an order but reports to the OCS 102 that the order was not received. Delivery verification steps provide additional data points for the OCS 102 to use when determining if errors and/or fraud have occurred in the delivery of an order (or subsequent reports about the order). In some implementations, once the verification module 220 determines the proper verification method for an order, the verification module 220 instructs a CMA 106, PMA 112, customer 104 and/or picker 108 to perform the verification method through a verification UI generated by the user interface engine 216. Verification methods can involve manual steps undertaken by a customer 104 and/or picker 108 (such as instructing a customer 104 to sign off on a delivery of an item) or may be undertaken automatically by a CMA 106 and/or PMA 112 using the capabilities of the associated devices. After completion of the verification method, the CMA 106 and/or PMA 112 can send the result of the verification method to the verification module 220 for later reference. For example, verification method results can be stored in the transaction record database 108 entry for the verified order.

One available verification method is signature verification, where the customer 102 signs off on receipt of the order through the PMA 112 on the picker's mobile device. However, signature verification requires the picker 108 and the customer 102 to physically exchange a device for the customer to sign off using. Generally, signature verification requires the customer 102 to be physically present at the time of delivery and cannot be easily be performed in a contactless manner. Similarly, depending on the type of mobile device used by the picker 102, the customer 102 might have a difficult time signing on the picker's mobile device.

Photo verification is another example verification method used by some embodiments of an OCS 102. To perform photo verification, the OCS 102 can instruct a picker 108 to take a photo of the order at the delivery location at the time of delivery which the OCS 102 can use to verify delivery of the order. Photo verification can be used for contactless deliveries and does not require any action by the customer 104, but (depending on the composition of the photo and identifying features of the delivery location) it can be difficult to determine if the pictured location is actually the correct delivery location based on the verification photo alone.

In some implementations, the verification module 220, uses audio pairing for delivery verification. Audio verification may be used to verify physical proximity of the customer device and picker device (and, by proxy, the picker 108 and the customer 104) without requiring physical contact between picker 108 and customer 104. In some implementation, audio verification can be performed automatically through the CMA 106 and PMA 112 without requiring specific actions by the picker 108 and customer 106 (other than, in some cases, to have the CMA 106 and PMA 112 open at the appropriate time). Audio verification can be performed during the process of completing the transaction on the customer device/picker device. In some implementations, audio verification is performed without the presence of the customer 104. For example, the audio verification can be performed between the picker 108 and a fixed-location device associated with the customer 104 (for example, a smart home device, smart doorbell, or other IoT device associated with the customer and/or the selected delivery location).

To perform audio pairing, a CMA 106 or PMA 112 may generate audio encoding a verification code for the order (herein, "verification audio"). The verification code can be an identifier of the order (such as an order number), an identifier of the customer 104, picker 108, or their devices (such as a device ID), a code generated from a combination of information about the transaction (such as the date or time of the transaction), or another suitably unique (or pseudo-unique) identifiers. In some embodiments, the verification code is an arbitrary sequence generated for the order.

The verification module of a device (the verification module 220, customer audio verification module 308, and/or the picker verification module 330, depending on the implementation) can encode the verification code in the verification audio using any suitable method, for example using pitch/frequency, rhythm, and/or loudness. The CMA 106/PMA 112 can then play verification code over a speaker of the corresponding mobile device. Simultaneously, the other party's mobile application (i.e. the mobile application receiving the verification audio) can listen for the verification audio through a microphone of the associated mobile device. While listening for the verification audio, the receiving mobile application can attempt to parse the captured audio for a verification code and, if a potential verification code is detected, decode the verification code.

In some implementations, the verification module 220 of the OCS 102 coordinates audio verification between the PMA 112 and CMA 108. The verification module 220 can instruct the PMA 112 or CMA 108 to play or listen for verification audio at the appropriate time such that the verification audio is being listened for as it is being played. For example, the verification module 220 can monitor the current location of the PMA 112 (for example, through a GPS of the picker's mobile device) and instruct the CMA 108 to begin listening for the verification audio once the picker mobile device is within a target distance of the delivery location. Similarly, the verification module 220 can instruct/enable the PMA 112 to play verification audio based on a confirmation that the CMA 108 is listening for the verification audio.

If a decoded verification code matches the expected verification code, the verification module 220 can verify that the picker device and customer device are within a certain proximity (based on the loudness of verification audio, etc.). Depending on the implementation, verification audio can be played either by the CMA 106 or the PMA 112 (based on the specific user interfaces or mobile application capabilities of that implementation).

In some embodiments, verification audio is played at a human-audible frequency (for example, disguised as part of a tone or chime to make the verification audio more pleasant to listen to). Alternatively, verification audio can be played at ultrasonic frequency (a frequency higher than perceivable to the human ear (depending on the implementation and the capabilities of the customer device and picker device).

The verification module 220 may select one or more verification methods for an order based on the cost of the order, the type of products of the order, the delivery location (for example, deliveries to high traffic or high density areas may require verification more often than low density areas), and/or preference settings of the customer 104 (or picker 108). For example, a customer 104 may request that deliveries to a certain address always be verified. In some embodiments, the verification module 220 assigns alternative verification methods (or a hierarchy of verification methods) to each transaction, such that if a selected first choice verification method fails, the verification module 220 can perform an alternative verification method for the delivery (etc.). For example, if audio verification of a transaction fails, the verification module 220 can fall back on photo or signature verification for that transaction. If no appropriate verification method can be completed for an order, delivery of the order may be delayed or proceed without verification.

Figure 3A:
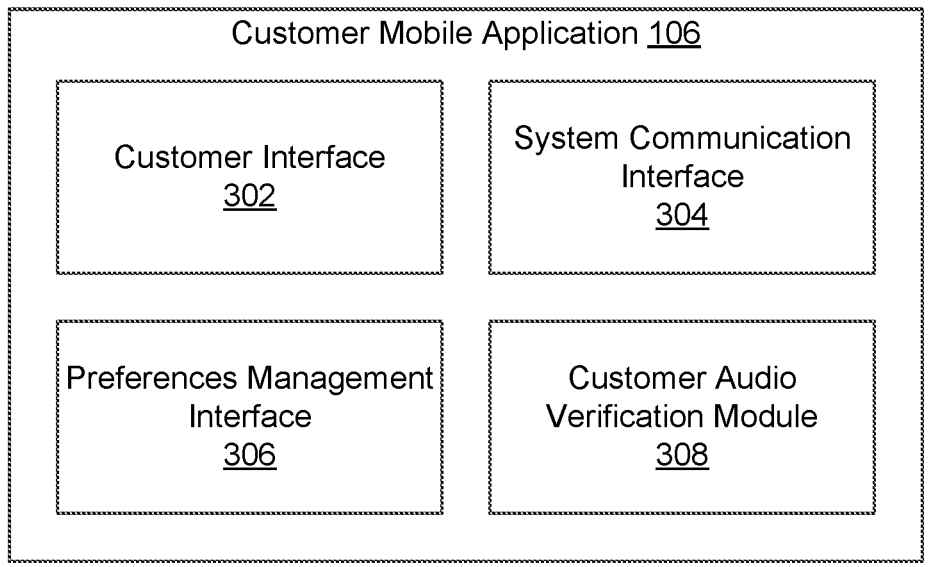
FIG. 3A is a block diagram of a customer mobile application (CMA) of the online concierge system, according to an example embodiment.

FIG. 3A is a block diagram of the customer mobile application (CMA) 106, according to one embodiment. A customer 104 can access the CMA 106 using a client device such as a mobile phone, tablet, laptop, or desktop computer (herein, a "customer device"). The CMA 106 may be accessed through an app running on the customer device or through a website accessed in a browser. The customer device executing the CMA 106 can be connected to the online concierge system 102 through one or more networks (such as the internet) using wired, wireless, or mobile data technologies. In some embodiments, the CMA 106 includes a customer interface 302, which provides an interactive user interface through which a customer 104 can browse through and select products, place an order, or view recommendations for suggested products. As described above, the user interface module 216 can control content that appears in the customer interface 302 of a CMA 106 and can send user interface information content, layout, or other information to the CMA 106 for display to the customer 104.

The CMA 106 can include a system communication interface 304 which, among other functions can receive inventory information and user interface content from the online concierge system 102 and transmits order information or other customer selections (for example, made via the customer interface 302) to the online concierge system 102. The CMA 106 also includes a preferences management interface 306, which allows the customer 104 to manage basic information associated with his/her account, such as his/her home address and payment instruments. The preferences management interface 306 may also allow the user to manage other details such as his/her favorite or preferred retailers 110, preferred delivery times, special instructions for delivery, desired level to delivery verification, and so on. As described above, the CMA 106 may include delivery verification functionality. The customer audio verification module 308 can perform verification methods for pending orders and relay the results of the verification methods to the OCS 102. For example, the CMA 106 can activate an "audio verification mode" which listens for and attempts to decode verification audio over a microphone of the customer device to listen for verification audio in response to instructions from the verification module 120. If verification audio is picked up on the microphone, the CMA 106 can decode the verification code and match the verification code with an expected verification code for the pending order. In order to use a mobile device's microphone to listen for a verification code, the CMA 106 may need to be actively running on the customer's mobile device. For example, the OCS 102 can send a push notification to the CMA 106 instructing a customer 104 to open the CMA 106 to verify delivery of their order. In some implementations, the CMA 106 can capture audio verification audio in the background or with minimal UI presence (as the UI of the displays other information, such as a current picker location, order information, and the like).

Figure 3B:
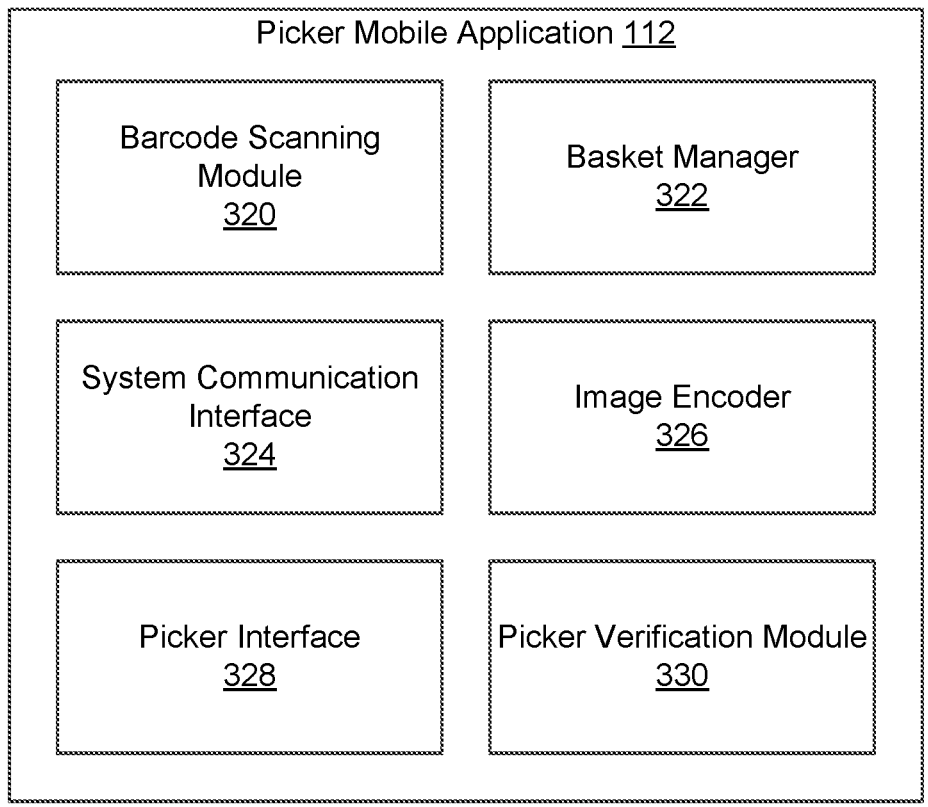
FIG. 3B is a block diagram of a picker mobile application (PMA) of the online concierge system, according to an example embodiment.

FIG. 3B is a block diagram of the picker mobile application (PMA) 112, according to one embodiment. A picker 108 can access the PMA 112 via a mobile client device, such as a mobile phone or tablet (herein, a "picker device"). The PMA 112 may be accessed through an app running on the mobile client device or through a website accessed in a browser. The picker device associated with the CMA 106 can be connected to the online concierge system 102 through one or more networks (such as the internet) using wired, wireless, or mobile data technologies. In some implementations, the PMA 112 includes a barcode scanning module 320 which allows a picker 108 to scan an item at a retailer 110 (such as a can of soup on the shelf at a grocery store). The barcode scanning module 320 may also include an interface which allows the picker 108 to manually enter information describing an item (such as its serial number, SKU, quantity and/or weight) if a barcode is not available to be scanned. The PMA 112 can also include a basket manager 322 which maintains a running record of items collected by the picker 108 for purchase at a retailer 110. This running record of items is commonly known as a "basket." In one embodiment, the barcode scanning module 320 transmits information describing each item (such as its cost, quantity, weight, etc.) to the basket manager 322, which updates its basket accordingly. The PMA 112 also includes an image encoder 326 which encodes the contents of a basket into an image. For example, the image encoder 326 may encode a basket of goods (with an identification of each item) into a QR code which can then be scanned by an employee of the retailer 110 at check-out when the picker 108 is making a fulfillment purchase.

The PMA 112 also includes a system communication interface 324, which interacts with the online concierge system 102. For example, the system communication interface 324 receives information from the online concierge system 102 about the items of an order, such as when a customer 104 updates an order to include more or fewer items. The system communication interface may receive notifications and messages from the online concierge system 102 indicating information about an order or communications from a customer 104. The system communication interface 324 may send this information to a picker interface 328, which generates a picker user interface to display the received information to the picker 108. In some embodiments, the picker interface 328 is an interactive interface through which pickers 108 may interact with customers 104 and the online concierge service 102 and receive notifications regarding the status of orders they are assigned. For example, pickers 108 may view their orders through the picker interface 328 and indicate when there is an issue with an item in an order, such as the item being out of stock or of poor quality.

Similarly, the PMA 112 can include a picker verification module 330 and one or more verification user interfaces used to perform one or more verification methods. The picker verification module 330 can manage the performance of verification methods through the corresponding interfaces of the picker interface 328. For example, the PMA 112 can include user interfaces for collecting customer 104 signatures for signature verification, taking and/or uploading photos for photo verification, and for performing audio verification. The picker verification module 330 can gathered and process verification information (such as verification photos or customer 104 signatures) and send the verification information to the OCS 102. As described above, a CMA 106 can activate an "audio verification mode" which listens for and attempts to decode verification audio over a microphone of the customer device. Correspondingly, the PMA 112 can include audio verification functionality, which encodes and/or plays verification audio through a speaker of the picker device. In other embodiments, the PMA 112 can listen for verification audio played by the CMA 106. In some implementations, the picker manually triggers playback of verification audio (when authorized by the OCS 102) through a UI of the PMA 112. For example, the PMA 112 can provide a UI with a button to begin audio verification playback which can be pressed by the picker once the customer 104 reaches a suitable distance. Alternatively, verification audio can be played automatically as a part of the delivery process (or responsive to received instructions from the OCS 102), for example, verification audio can be included in a chime, tone, or jungle played as part of the delivery process.

Figure 4:
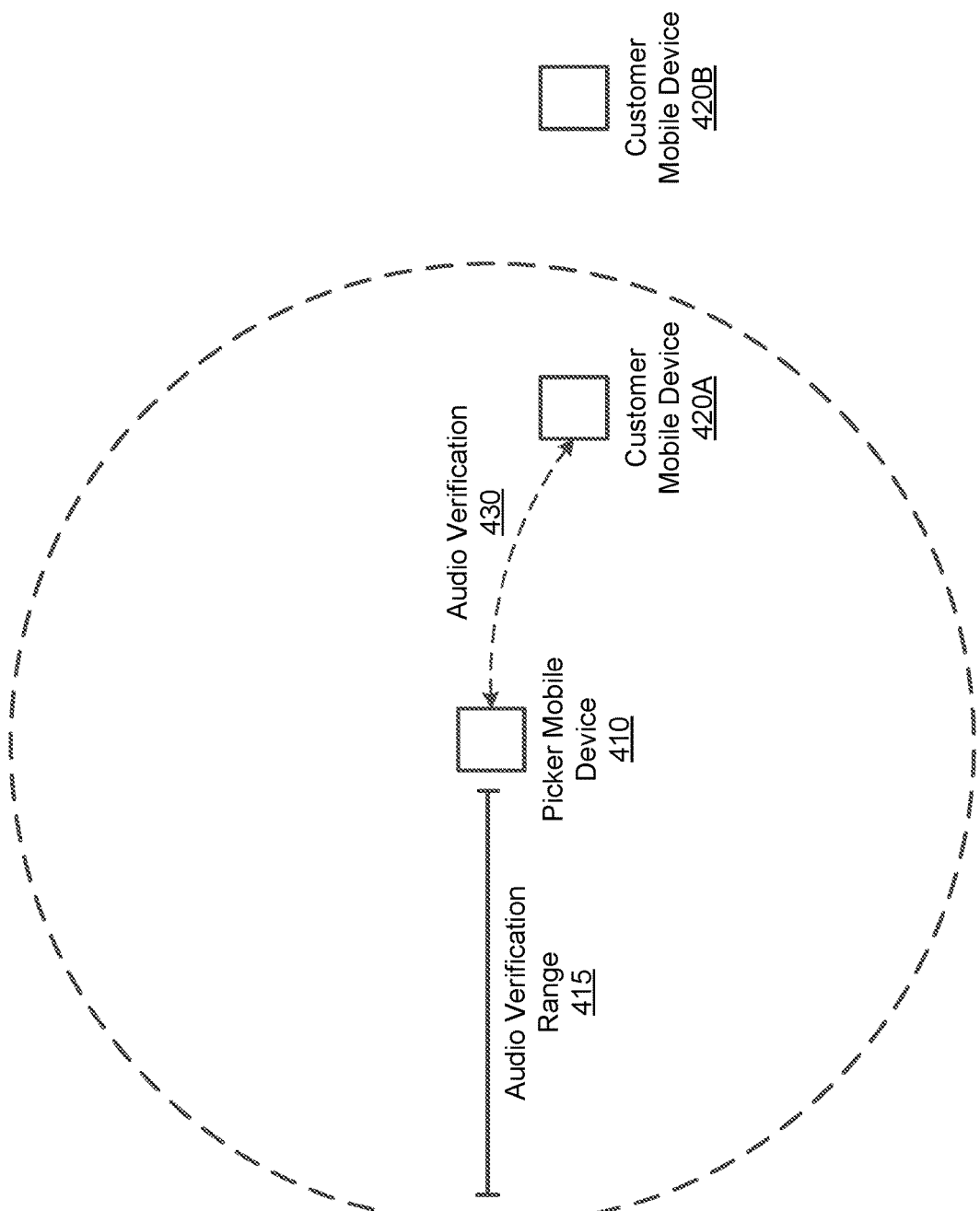
FIG. 4 illustrates an environment in which picker and customer mobile devices perform audio verification, according to an example embodiment.

FIG. 4 illustrates an environment in which picker and customer mobile devices perform audio verification, according to an example embodiment. The environment 300 of FIG. 4 includes a picker mobile device (PMD) 410 and customer mobile devices (CMD) 420A and 420B. The PMD 410 is performing audio verification 430 with the CMD 420A, which is within the audio verification range 415.

A PMA 112 executing on the PMD 410 can perform audio verification within the audio verification range 415. Effective audio verification range can depend on environmental factors (such as ambient noise levels), and the capabilities of the broadcasting PMD 410 and listening CMD 420 (or vice-versa depending on which device is playing the verification audio). For example, a loud ambient environment can reduce the ability of a mobile device microphone to accurately identify verification audio, while differing capabilities and setting of microphones and speakers can determine the volume at which verification audio can be played and/or detected by the mobile devices.

In the example environment 400, the customer mobile device 420A is within the audio verification range 415 of the picker mobile device 410. Therefore, the PMA 410 and the CMA 420A are able to perform audio verification 430 using audio pairing as described above. If the CMA is outside the audio verification range 415 (for example, the CMA 420B) and therefore cannot detect verification audio played by the PMA 410.

Example Verification Methods

Figure 5:
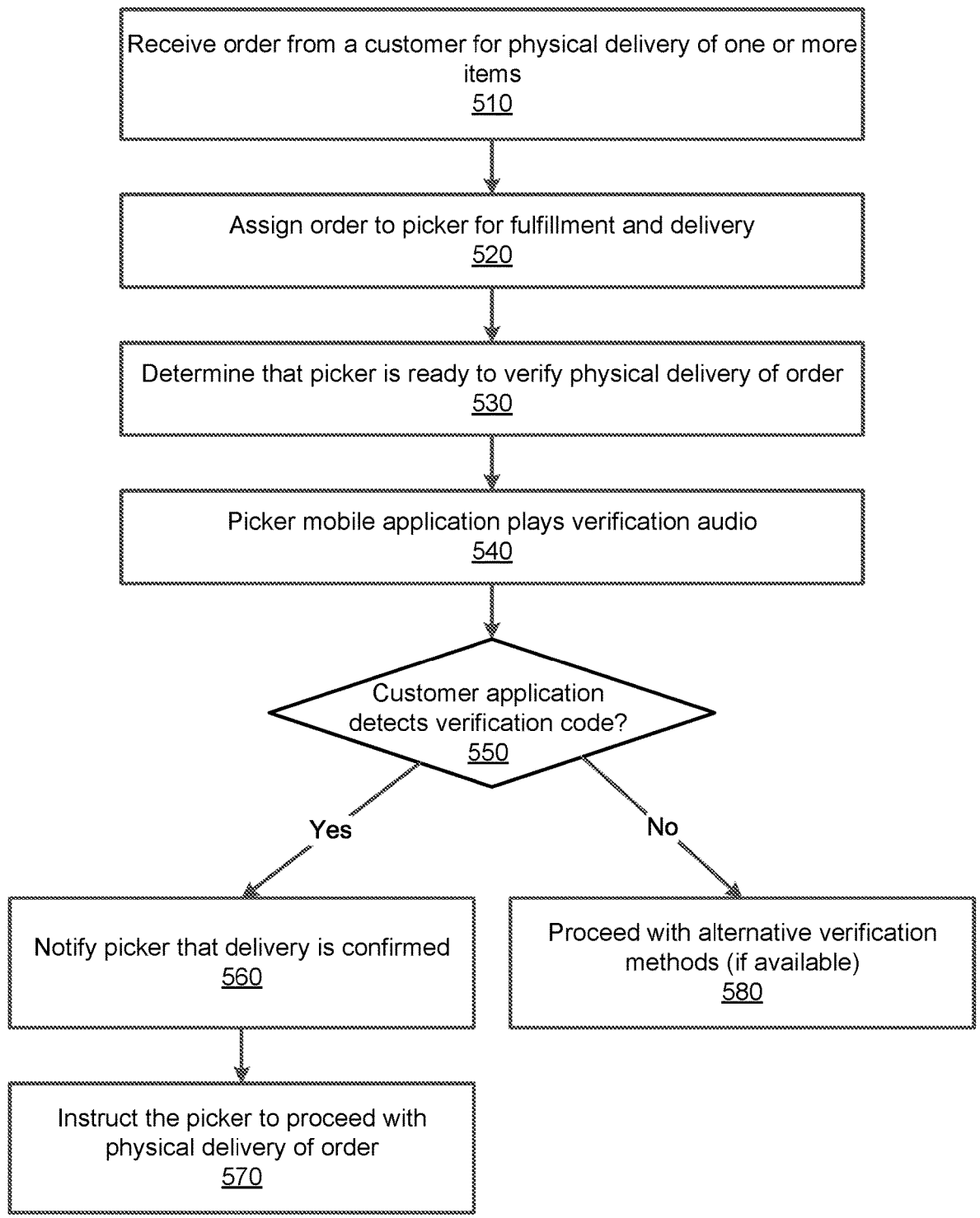
FIG. 5 is a flowchart illustrating a process for performing audio verification of a delivery using a picker mobile application, according to an example embodiment.

FIG. 5 is a flowchart illustrating a process for performing audio verification of a delivery using a picker mobile application, according to an example embodiment. The process 500 begins when the online concierge system receives 510 an order from a customer for physical delivery of one or more items. The online concierge system then assigns 520 the order to a picker for fulfillment and delivery. For example, the online concierge system can select a picker and provide order details and instructions for fulfillment/delivery to the picker through a picker mobile application. Once the online concierge system determines 530 that the picker is ready to verify the physical delivery of the order, for example, based on a communication from the picker mobile application that delivery is ready to be verified, the online concierge system can instruct 540 the picker mobile application to play verification audio containing a verification code for the order. As described above, the picker mobile application can receive and/or encode verification audio containing a verification code, which the application can play when authorized by the online concierge system (for example, in response to a picker input). At the same time, a customer mobile application associated with the customer can listen for the verification audio. If the customer mobile application detects 550 the verification code in captured audio, the online concierge system can notify 560 the picker that delivery is confirmed and proceed to instruct 570 the picker to proceed with delivery. Alternatively, if the customer application fails to detect 550 the verification code, the online concierge system can proceed 580 with alternative verification methods and/or attempt to retry audio verification.

Figure 6:
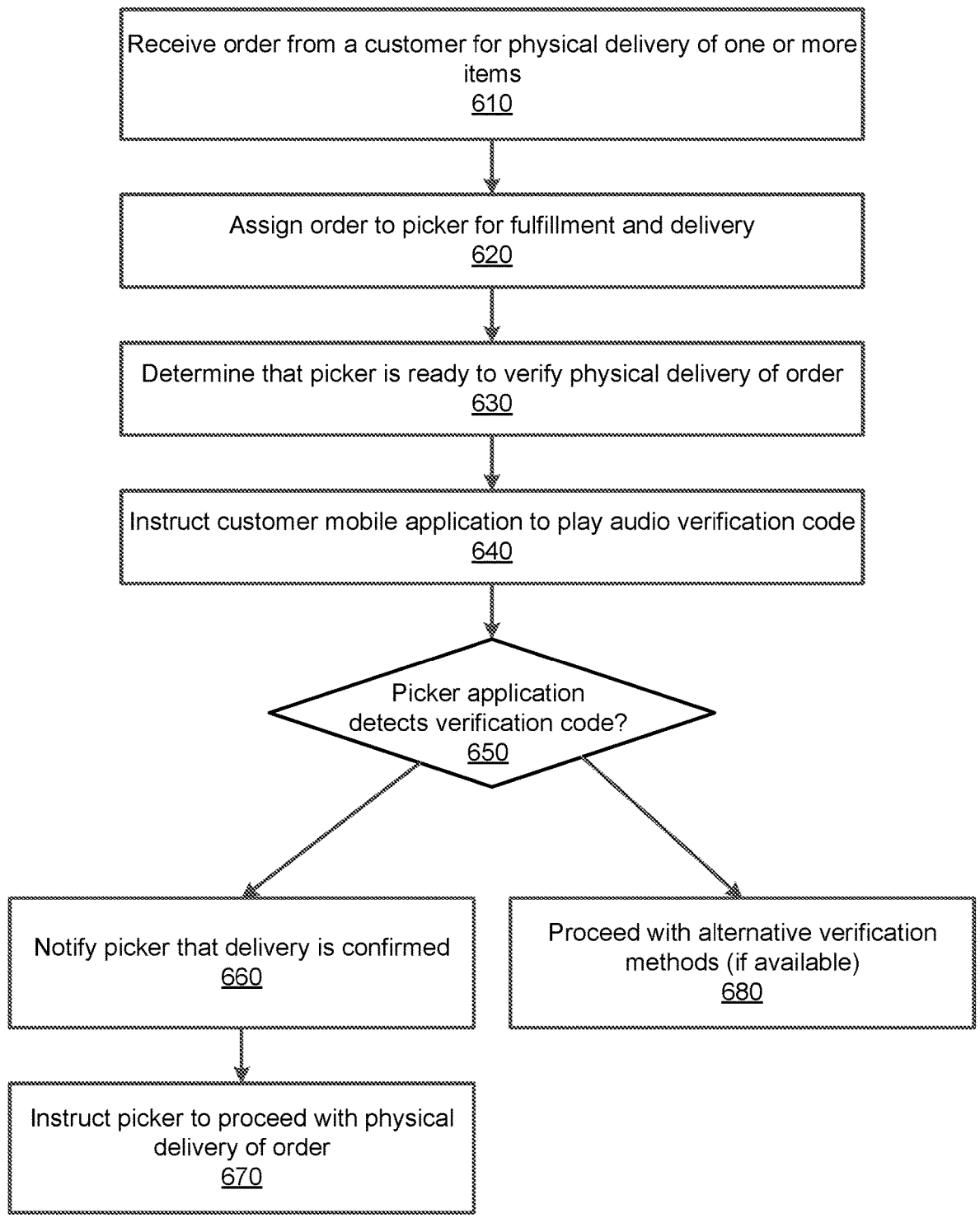
FIG. 6 is a flowchart illustrating an alternative process for performing audio verification of a delivery using a customer mobile application, according to an example embodiment.

FIG. 6 is a flowchart illustrating an alternative process for performing audio verification of a delivery using a customer mobile application, according to an example embodiment. The process 600 begins similar to the process 500 of FIG. 5, with the online concierge system receiving 610 an order from a customer for physical delivery of one or more items, assigning 620 the order to a picker for fulfillment and delivery, and determining 630 that the picker is ready to verify the physical delivery of the order. At this point, the online concierge system can instruct 640 the customer mobile application (as opposed to the picker mobile application of process 500) to play verification audio containing a verification code for the order. Like the picker mobile application of process 500, the customer mobile application can receive and/or encode verification audio containing a verification code, which the application can play when authorized by the online concierge system (for example, in response to a signal from the online concierge system). At the same time, the picker's mobile application can listen for the verification audio. If the picker mobile application detects 650 the verification code in captured audio, the online concierge system can notify 660 the picker that delivery is confirmed and proceed to instruct 670 the picker to proceed with delivery. Alternatively, if the picker application fails to detect 650 the verification code, the online concierge system can proceed 680 with alternative verification methods and/or attempt to retry audio verification.

Other Considerations

The present invention has been described in particular detail with respect to one possible embodiment. Those of skill in the art will appreciate that the invention may be practiced in other embodiments. First, the particular naming of the components and variables, capitalization of terms, the attributes, data structures, or any other programming or structural aspect is not mandatory or significant, and the mechanisms that implement the invention or its features may have different names, formats, or protocols. Also, the particular division of functionality between the various system components described herein is merely for purposes of example, and is not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of computer-readable storage medium suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the present invention is not described with reference to any particular programming language. It is appreciated that a variety of programming languages may be used to implement the teachings of the present invention as described herein, and any references to specific languages are provided for invention of enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes and may not have been selected to delineate or circumscribe the inventive subject matter. Accordingly, the disclosure of the present invention is intended to be illustrative, but not limiting, of the scope of the invention, which is set forth in the following claims.

What is claimed is:
1. A method comprising:
   receiving, at an online system, an order for physical delivery to a customer, the customer associated with a customer device;
   assigning, by the online system, the order to a picker for physical delivery, the picker associated with a picker device executing a picker mobile application configured to perform an audio handshake with the customer device to verify physical delivery;
   generating a verification code for the order;
   transmitting the verification code to both the customer device and the picker device;
   responsive to determining that the delivery device is within a target distance of a delivery location, causing one of the customer device or the picker device to play verification audio encoding the verification code;
causing another one of the customer device or the picker device to:
receive the verification audio, comprising capturing, via a microphone of the other one of the customer device or the picker device, audio potentially containing the verification audio;
attempt to decode the audio verification code from the captured audio; and
detect a verification code from the verification audio based on the attempting to decode the audio verification;
confirm whether the detected verification code is same as the verification code received from the online system; and
responsive to confirming that the detected verification code is same as the verification code received from the online system, send a confirmation to the online system;
receiving the confirmation from the other one of the customer device or the picker device, wherein receiving confirmation comprises receiving, from the other one of the customer device or the picker device, confirmation that the other one of the customer device or the picker device has detected the verification audio; and
responsive to the confirmation, recording a verified delivery for the order.

2. The method of claim 1, wherein the picker mobile application is further configured to play the verification audio comprising the audio verification code and wherein receiving confirmation of an exchange of the verification audio comprising the audio verification code between the picker device and the customer device comprises:
receiving, from the customer device, confirmation that the customer device has detected the verification audio.

3. The method of claim 2, wherein the customer device is configured to:
capture, via a microphone of the customer device, audio potentially containing the verification audio;
attempt to decode the audio verification code from the captured audio; and
responsive to successfully decoding the audio verification code from the captured audio, send, to the online system, confirmation that the customer device has detected the verification audio.

4. The method of claim 2, further comprising:
instructing, by the online system, the picker mobile application to play the verification audio; and
instructing, by the online system, the customer device to begin capturing audio potentially containing the verification audio.

5. The method of claim 1, wherein the customer device is configured to play the verification audio comprising the audio verification code and wherein receiving confirmation of an exchange of the verification audio comprising the audio verification code between the picker device and the customer device comprises:
receiving, from the picker mobile application, confirmation that the picker device has detected the verification audio.

6. The method of claim 5, wherein the picker mobile application is further configured to:
capture, via a microphone of the picker device, audio potentially containing the verification audio;
attempt to decode the audio verification code from the captured audio; and
responsive to successfully decoding the audio verification code from the captured audio, send, to the online system, confirmation that the picker mobile application has detected the verification audio.

7. The method of claim 5, further comprising:
instructing, by the online system, the customer device to play the verification audio; and
instructing, by the online system, the picker mobile application to begin audio potentially containing the verification audio.

8. The method of claim 1, wherein the audio verification code comprises an identifier of the order.

9. The method of claim 1, wherein determining the picker is ready to verify delivery comprises determining, via a location tracking functionality of the picker device, that the picker device is within a target distance of a delivery location associated with the order.

10. The method of claim 1, wherein determining the picker is ready to verify delivery comprises receiving, at the online system from the picker device, an indication that the picker device is ready to verify delivery of the order.

11. The method of claim 1, wherein recording a verified delivery for the order comprises storing, in a database of the online system, information about the verified delivery.

12. The method of claim 1, wherein recording a verified delivery for the order comprises notifying the picker device that the delivery has been confirmed and to proceed with physical delivery.

13. The method of claim 1, further comprising selecting, from a plurality of potential verification methods, audio verification for the order.

14. A non-transitory computer readable storage medium comprising instructions which, when executed by a processor of an online system, cause the processor to perform the steps of:
receiving, from a customer device associated with a customer, an order for physical delivery to a customer;
assigning the order to a picker for physical delivery, the picker associated with a picker device executing a picker mobile application configured to perform an audio handshake with the customer device to verify physical delivery;
generating a verification code for the order;
transmitting the verification code to both the customer device and the picker device;
responsive to determining that the delivery device is within a target distance of a delivery location, causing the customer device or the picker device to perform an audio handshake, the audio handshake comprising:
causing one of the customer device or the picker device to play verification audio encoding the verification code;
causing another one of the customer device or the picker device to:
receive the verification audio, comprising capturing, via a microphone of the other one of the customer device or the picker device, audio potentially containing the verification audio;
attempt to decode the audio verification code from the captured audio; and
detect a verification code from the verification audio based on the attempting to decode the audio verification;

confirm whether the detected verification code is same as the verification code received from the online system; and responsive to confirming that the detected verification code is same as the verification code received from the online system, send a confirmation to the online system;

receiving the confirmation from the other one of the customer device or the picker device, wherein receiving confirmation comprises receiving, from the other one of the customer device or the picker device, confirmation that the other one of the customer device or the picker device has detected the verification audio; and responsive to the confirmation, recording a verified delivery for the order.

15. The non-transitory computer readable storage medium of claim 14, wherein causing the customer device or the picker device to perform an audio handshake comprises:

capturing, via a microphone of the customer device, audio potentially containing the verification audio;

attempting to decode the audio verification code from the captured audio; and responsive to successfully decoding the audio verification code from the captured audio, sending, to the online system, confirmation that the customer device has detected the verification audio.

16. The non-transitory computer readable storage medium of claim 15, wherein the steps further comprise:

receiving, from the online system, an instruction to begin capturing audio potentially containing the verification audio as part of the audio handshake; and wherein participating in the audio handshake occurs responsive to receiving the instruction.

17. The non-transitory computer readable storage medium of claim 14, wherein participating in an audio handshake with a picker device to verify physical delivery of the order comprises playing the verification audio comprising the audio verification code.

18. The non-transitory computer readable storage medium of claim 17, wherein the steps further comprise:

receiving, from the online system, an instruction to play the verification audio as part of the audio handshake; and wherein participating in the audio handshake occurs responsive to receiving the instruction.

19. The non-transitory computer readable storage medium of claim 14, wherein the audio verification code comprises an identifier of the order.

20. The non-transitory computer readable storage medium of claim 14, wherein the steps further comprise:

receiving, from the online system, the audio verification code.

* * * * *